United States Patent [19]

Lee

[11] Patent Number: 5,440,399
[45] Date of Patent: Aug. 8, 1995

[54] METHOD FOR OPTICAL EXPOSURE IN A COLOR VIDEO PRINTED UTILIZING LCD

[75] Inventor: Kwang J. Lee, Seoul, Rep. of Korea

[73] Assignee: Goldstar Co., Ltd., Seoul, Rep. of Korea

[21] Appl. No.: 863,825

[22] Filed: Apr. 6, 1992

[30] Foreign Application Priority Data

Apr. 6, 1991 [KR] Rep. of Korea ............... 5541/1991

[51] Int. Cl.$^6$ .................. H04N 1/46; G03G 15/01; G01D 9/42; G02F 1/1335
[52] U.S. Cl. ................... 358/300; 359/64; 347/332
[58] Field of Search ............. 358/300, 296, 298, 501, 358/515, 524; 346/107 R, 157; 359/59, 64

[56] References Cited

U.S. PATENT DOCUMENTS

| | | | |
|---|---|---|---|
| 4,591,886 | 5/1986 | Umeda et al. | 358/300 X |
| 4,605,972 | 8/1986 | Hatanaka | 358/296 X |
| 4,636,807 | 1/1987 | Head | 358/298 X |
| 4,783,146 | 11/1988 | Stephany et al. | 346/160 X |
| 4,819,084 | 4/1989 | Bark | 358/296 |
| 4,842,379 | 6/1989 | Oishi et al. | 359/64 |
| 4,907,862 | 3/1990 | Suntola | 359/64 |
| 4,939,529 | 7/1990 | Kanayama et al. | 346/108 |
| 5,032,911 | 7/1991 | Takimoto | 358/302 X |
| 5,105,281 | 4/1992 | Kusaka | 346/107 R X |

Primary Examiner—Benjamin R. Fuller
Assistant Examiner—Eric Frahm
Attorney, Agent, or Firm—Fliesler, Dubb, Meyer & Lovejoy

[57] ABSTRACT

An optical exposure system for a color video printer, comprising a microprocessor for controlling optical exposure for R, G and B video signals, a memory device for storing the R, G and B video signals by the frame, a drive control device for inputting R, G and B video data from the memory device and outputting signal voltages and gate voltages of fixed levels as drive control signals for optical exposure of a photosensitive medium, and a LCD panel for performing the optical exposure of the photosensitive medium in response to the drive control signals from the drive control device. The gradation number of exposure amount is determined by fixing levels of the signal voltages to fix transmitivities of R, G and B liquid crystal elements and determining the number of exposure times by R, G and B pixels to be proportioned respectively to the R, G and B data values. Therefore, gradations of colors to be printed by the color video printer can be increased in number so that sensitivity differences among R, G and B colors can be compensated for and visually-natural colors can be reemerged.

4 Claims, 5 Drawing Sheets

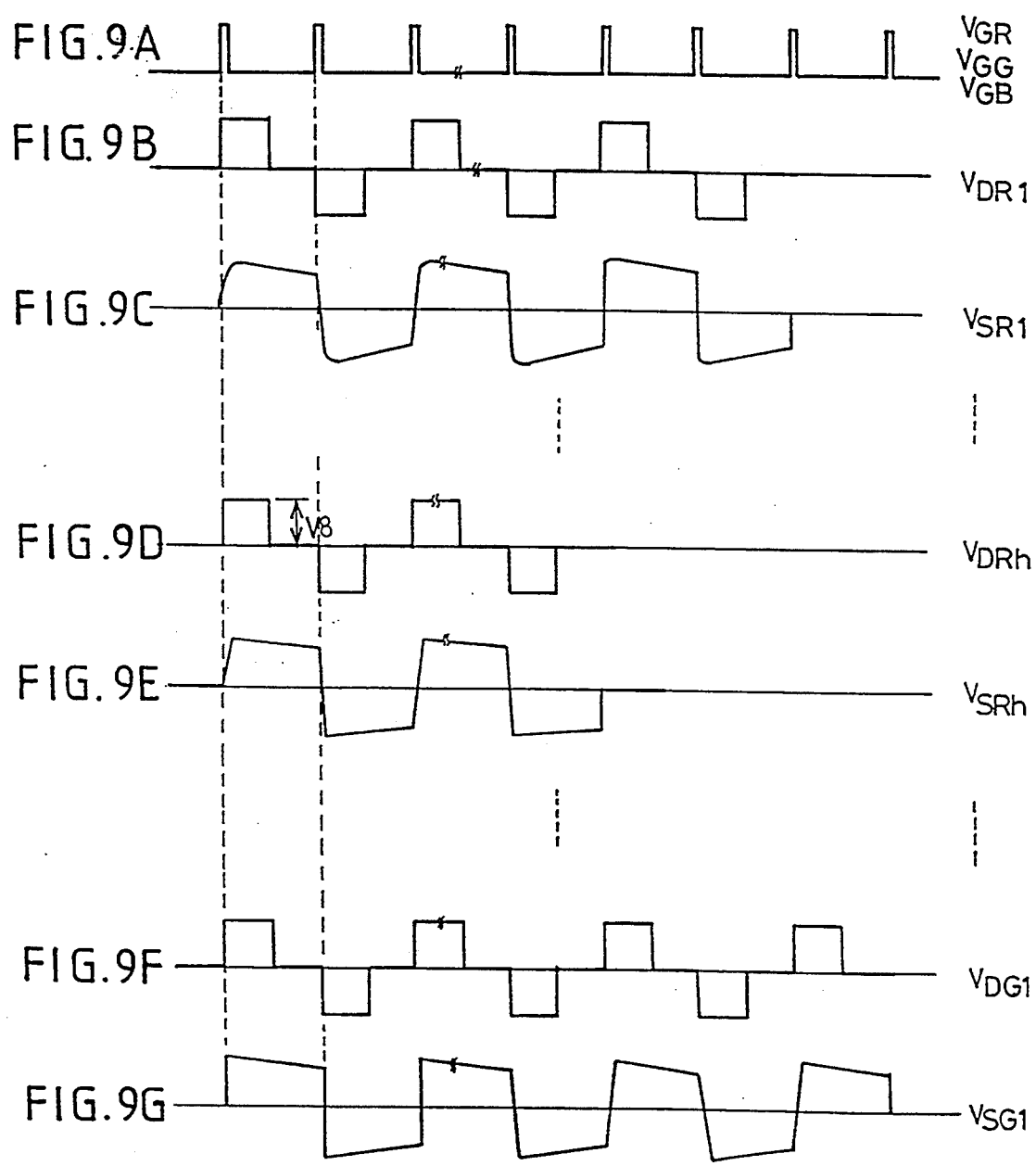

METHOD FOR OPTICAL EXPOSURE IN A COLOR VIDEO PRINTED UTILIZING LCD

BACKGROUND OF THE INVENTION

1. Field of the Invention

The present invention relates in general to a color video printer, and more particularly to optical exposure system and method for a color video printer, in which gradations of colors to be printed by the color video printer can be increased in number so that sensitivity differences among R, G and B colors can be compensated.

2. Description of the Prior Art

In a color video printer, generally, a photosensing process has been employed which records or prints an image by producing an optical image for an electric image signal and exposing a photosensitive medium to a light of the optical image. A cathode ray tube (CRT) has typically been employed in the photosensing process, for production of the optical image for the electric image signal. An optical lens system or an optical fiber has also been utilized in the photosensing process, in order to focus the optical image on the CRT accurately on the photosensitive medium. Noticeably, utilizing the optical lens system or the optical fiber requires a complex system construction with associated equipments, resulting in an increase in manufacturing cost. In this connection, there has been employed a fiber optics liquid crystal display (FOLCD) package which converts the electric image signal into the optical image utilizing a liquid crystal television technique which has recently been developed rapidly, thereby enabling a reduction in system volume and in manufacturing cost.

The FOLCD package is adapted to determine transmitivities of liquid crystal elements by pixels by applying the electric image signal to a liquid crystal display (LCD) panel. In accordance with the determined transmitivities, light from the bottom side of the LCD panel is transmitted to the liquid crystal elements for the conversion of the electric image signal into the optical image to which the photosensitive medium is optically exposed through a screen consisting of the optical fiber.

Referring to FIG. 1, there is shown an example of a conventional optical exposure system for a color video printer in block form. The illustrated system comprises a LCD panel 20 and a LCD controller 10 which inputs R, G and B video signals and outputs gate voltages $V_G$ corresponding to R, G and B colors and video signal voltages $V_D$ corresponding to pixels, to the LCD panel 20. Also, the LCD panel 20 includes R, G and B-line LCDs 21–23 which are in close contact with one another, as shown in FIG. 2.

Referring to FIG. 3, there is shown an equivalent circuit diagram of the LCD panel 20. As shown in this drawing, the LCD panel 20 includes three, R, G and B groups of thin film transistors $T_{R1}$-$T_{Rh}$, $T_{G1}$-$T_{Gh}$ and $T_{B1}$-$T_{Bh}$ corresponding to the R, G and B-line LCDs 21–23 and to the number of pixels 1-h on one horizontal line. The three groups of thin film transistors $T_{R1}$-$T_{Rh}$, $T_{G1}$-$T_{Gh}$ and $T_{B1}$-$T_{Bh}$ are connected to three, R, G and B groups of liquid crystal elements $L_{R1}$-$L_{RH}$, $L_{G1}$-$L_{Gh}$ and $L_{B1}$-$L_{Gh}$ which form corresponding pixels on the R, G and B lines, for driving them. The gate terminals of the thin film transistors $T_{R1}$-$T_{Rh}$, $T_{G1}$-$T_{Gh}$ and $T_{B1}$-$T_{Bh}$ are commonly connected with one another by lines, in order to receive, by R, G and B lines, the R, G and B gate voltages $V_G$ ($V_{GR}$, $V_{GG}$ and $V_{GB}$) from the LCD controller 10. Also, the drain terminals of the thin film transistors $R_{R1}$-$T_{Rh}$, $T_{G1}$-$T_{Gh}$ and $T_{B1}$-$T_{Bh}$ are commonly connected with one another by pixels, in order to receive, by pixels, the signal voltages $V_D$ ($V_{D1}$-$V_{Dh}$) from the LCD controller 10.

The operation of the conventional optical exposure system with the above-mentioned construction will now be described with reference to FIGS. 4A to 4K and FIG. 5.

Referring to FIGS. 4A through 4K, there are shown timing diagrams illustrating the operation of the conventional optical exposure system. First as shown in FIGS. 4A to 4C, the R, G and B gate voltages $V_{GR}$, $V_{GG}$ and $V_{GB}$ from the LCD controller 10 are in sequence applied to the LCD panel 20, while the signal voltage $V_{D1}$ from the LCD controller 10 corresponding to the first pixel on one line is applied to the LCD panel 20 as shown in FIG. 4D. As a result, the thin film transistors $R_{R1}$, $T_{G1}$ and $T_{B1}$ in the LCD panel 20 are turned on by the R, G and B gate voltages $V_{GR}$, $V_{GG}$ and $V_{GG}$ from the LCD controller 10 as shown in FIGS. 4A to 4C, so that the signal voltage $V_{D1}$ at the drains thereof as shown in FIG. 4D is, by intervals $t_R$, $t_G$ and $t_B$, applied to the R, G and B liquid crystal elements $L_{R1}$, $L_{G1}$ and $L_{B1}$ corresponding to the first pixel. Then, the R, G and B liquid crystal elements $L_{R1}$, $L_{G1}$ and $L_{B1}$ maintain their levels respectively during one period T as shown in FIGS. 4E–4G.

As mentioned above, the signal voltages are, by pixels, applied synchronously with the timing of the gate voltages, for driving of the liquid crystal elements by pixels. Finally, when the signal voltage $V_{Dh}$ from the LCD control let 10 corresponding to the last pixel on one line is applied to the LCD panel 20 as shown in FIG. 4H, the R, G and B liquid crystal elements $L_{Rh}$, $L_{Gh}$ and $L_{Bh}$ corresponding to the last pixel maintain their levels respectively during one period T as shown in FIGS. 4I–4K, resulting in one line pixel driving completion.

Noticeably, the reason why the signal voltages $V_{D1}$-$V_{Dh}$ are applied as alternating current (AC) signals having polarities reversed every period is to avoid deteriorations in the liquid crystal elements. Also, the R, G and B liquid crystal elements $L_R$, $L_G$ and $L_B$ have capacitor effects to determine transmitivities of light from a light source according to the applied signal voltages, for production of the optical image for the electric image signal.

Herein, exposure amount of one pixel of the photosensitive medium to the optical image is determined based on exposure time of the pixel and intensity of the light of the optical image.

$$\text{Exposure amount(Energy)} = \text{Exposure time} * \text{Light intensity} \quad \ldots (1)$$

The exposure time and light intensity are determined respectively based on the timing relation and amplitudes of the signal voltages applied to the LCD panel 20. Namely, the exposure time is determined by a constant period T and the number n of times that the signal voltages are applied to the LCD panel 20.

$$\text{Exposure time} = T * n$$

Also, the light intensity is determined by amount L of back light before transmission and transmitivities determined based on the amplitudes of the signal voltages $V_{D1}$-$V_{Dh}$.

Referring to FIG. 5, there is shown voltage-transmitivity characteristics of the liquid crystal elements having eight gradations. From FIG. 5, it is seen that the liquid crystal elements have transmitivities $\alpha 1$-$\alpha 8$ of 8 steps according to the applied signal voltages V1-V8. Performing the photosensing for the photosensitive medium by applying the signal voltages V1-V8 to the drains of the corresponding liquid crystal elements, n times, then the R, G and B exposure amounts for respective pixels of the photosensitive medium can be obtained as follows:

$$\text{Exposure amount} = T * n * \alpha * L \quad \ldots (2)$$

where, T: period, n: the number of exposure times, $\alpha$: transmitivity and L: amount of back light before transmission to the LCD panel.

It is noted from the above equation (2) that the exposure amount, by R, G and B colors, for respective pixels of the photosensitive medium is of no more than 8 gradations resulting from the transmitivities a of 8 steps (gradations). For this reason, 512 colors can be produced by three, R, G and B colors.

$$8 * 8 * * = 512$$

It is generally known that, various color expressions more than 64 gradations by R, G and B colors are required to reemerge visually-natural colors. For this reason, the color video printer employing the 8-gradation liquid crystal display could not reemerge visually-natural colors, thereby resulting in degradation in the worth thereof.

SUMMARY OF THE INVENTION

Therefore, the present invention has been made in view of the above problem, and it is an object of the present invention to provide optical exposure system and method for a color video printer, whereby gradations of colors to be printed by the color video printer can be increased in number so that visually-natural colors can be reemerged.

In accordance with one aspect of the present invention, there is provided an optical exposure system for a color video printer, comprising: a microprocessor for controlling optical exposure for R, G and B video signals into which video dividing means divides a video signal; memory means for storing the R, G and B video signals under a control of said microprocessor; drive control means for inputting R, G and B video data from said memory means under a control of said microprocessor and outputting drive control signals for optical exposure of a photosensitive medium; and optical exposure means for performing the optical exposure of the photosensitive medium in response to the drive control signals from said drive control means.

In accordance with another aspect of the present invention, there is provided an optical exposure method for a color video printer, comprising the steps of: fixing levels of signal voltages for driving R, G and B liquid crystal elements in R, G and B liquid crystal displays, to fix transmitivities of said liquid crystal elements; determining the number of exposure times by R, G and B pixels to be proportioned respectively to R, G and B data values; applying the signal voltages of fixed levels to said R, G and B liquid crystal elements according to the determined number of exposure times so that said R, G and B liquid crystal elements are driven to produce an optical image for an electric image signal; and carrying out optical exposure of a photosensitive medium to the optical image by R, G and B lines by means of said liquid crystal displays.

BRIEF DESCRIPTION OF THE DRAWINGS

The above and other objects, features and advantages of the present invention will be more clearly understood from the following detailed description taken in conjunction with the accompanying drawings, in which:

FIGS. 9A through 9G are timing diagrams illustrating the operation of the system of FIG. 6 in accordance with the present invention.

DESCRIPTION OF PREFERRED EMBODIMENTS

Figure 1:
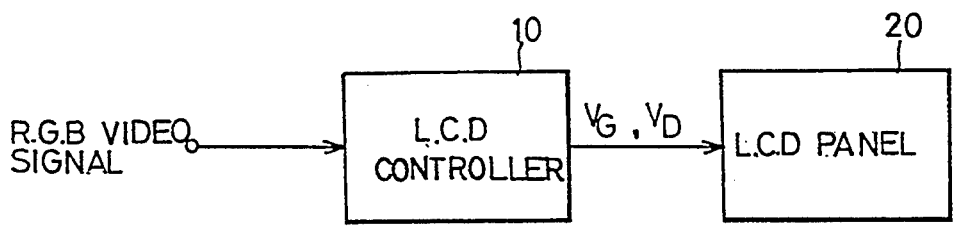
FIG. 1 is a schematic block diagram of a conventional optical exposure system for a color video printer.
Figure 2:
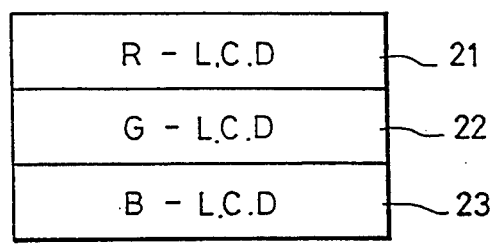
FIG. 2 illustrates a construction of a LCD panel in the system of FIG. 1.
Figure 3:
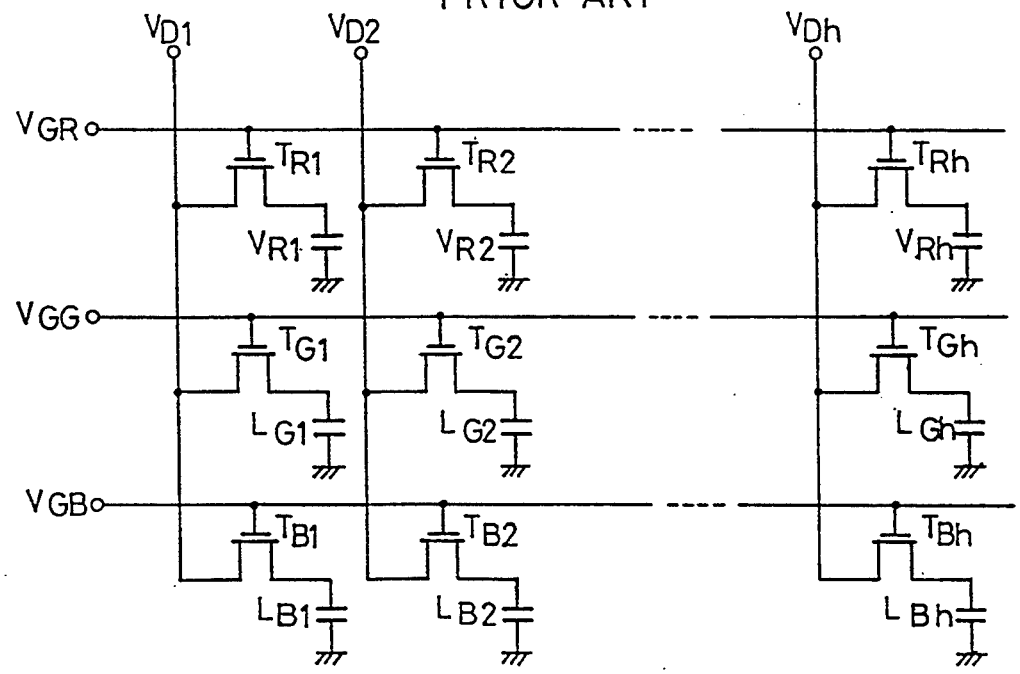
FIG. 3 is an equivalent circuit diagram of the LCD panel of FIG. 2.
Figure 4:
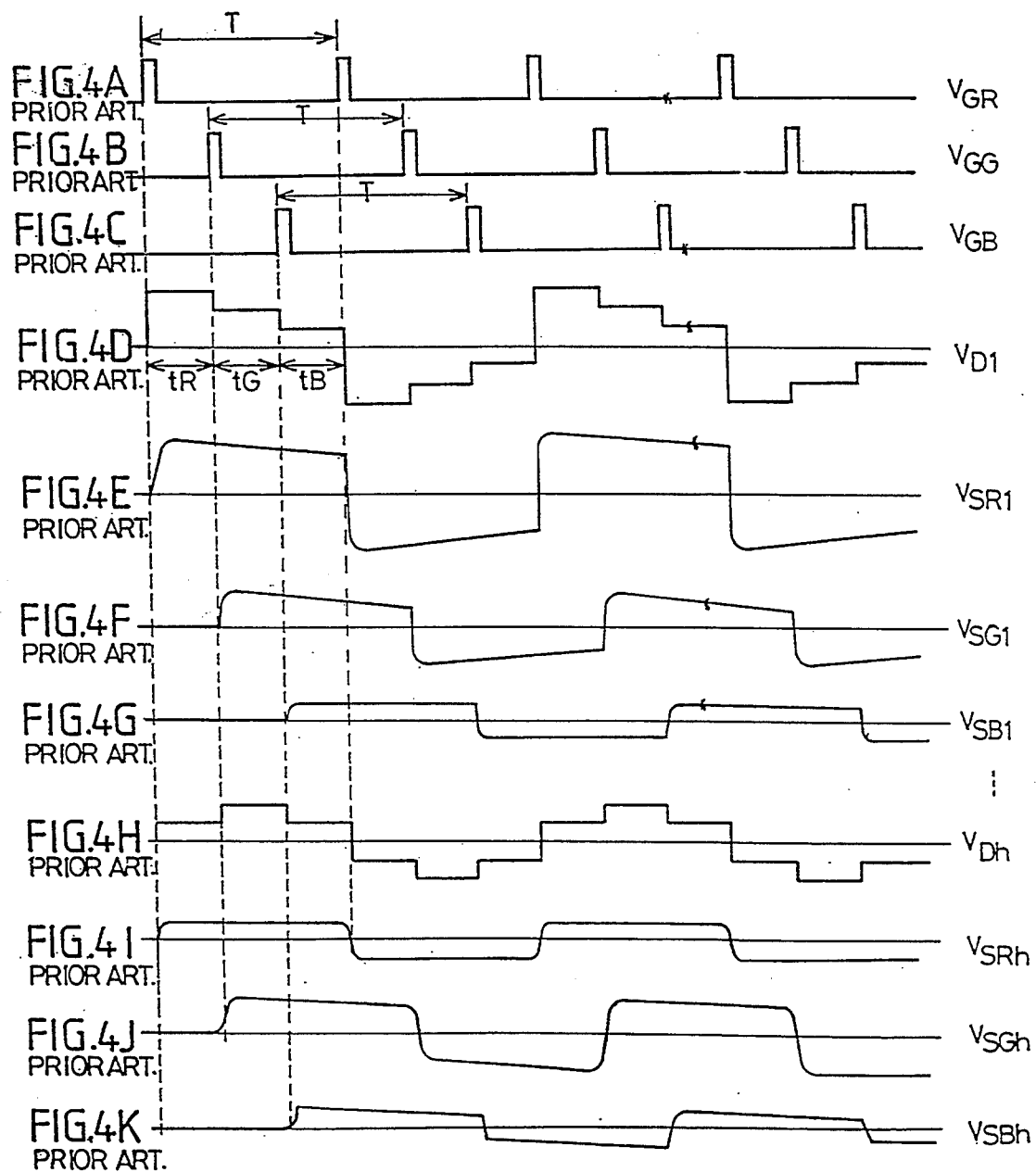
FIGS. 4A through 4K are timing diagrams illustrating the operation of the system of FIG. 1.
Figure 5:
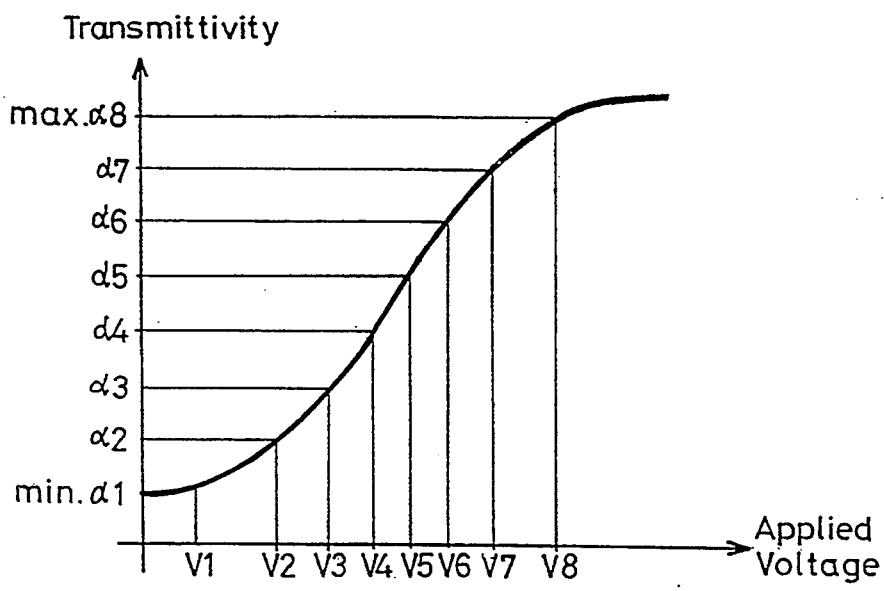
FIG. 5 illustrates voltage-transmitivity characteristics of liquid crystal elements having eight gradations, included in the LCD panel of FIGS. 2 and 3.
Figure 6:
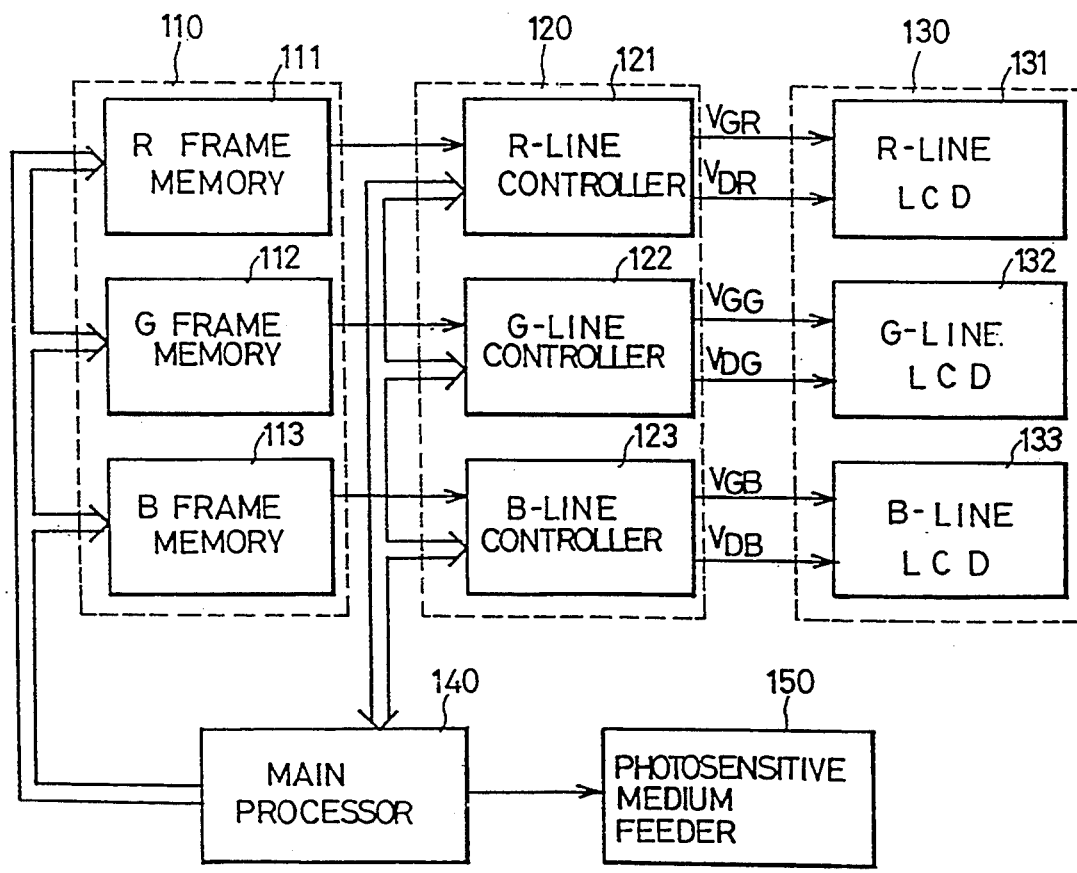
FIG. 6 is a block diagram of an optical exposure system for a color video printer in accordance with the present invention.

Referring to FIG. 6, there is shown an optical exposure system for a color video printer in accordance with the present invention, in block form. As shown in the drawing, the optical exposure system comprises a microprocessor 140 for controlling optical exposure for R, G and B video signals into which a video divider (not shown) divides a video signal, a memory device 110 for storing the R, G and B video signals under a control of the microprocessor 140, a drive control device 120 for inputting R, G and B video data from the memory device 110 under a control of the microprocessor 140 and outputting signal voltages and gate voltages of fixed levels as drive control signals for optical exposure of a photosensitive medium (not shown), and a LCD panel 130 for performing the optical exposure of the photosensitive medium in response to the drive control signals from the drive control device 120.

The memory device 110 is provided with R, G and B frame memories 111-113 for storing respectively the R, G and B video signals from the video divider by the frame under a control of the microprocessor 140. The drive control device 120 includes R, G and B-line controllers 121-123 for inputting respectively the R, G and B video data from the memory device 110 by the line under a control of the microprocessor 140 and outputting respectively the signal voltages and gate voltages of fixed levels, by pixels. Also, the LCD panel 130 is provided with R, G and B-line LCDs 131-133 which form a fiber optics liquid crystal display package. Also, the optical exposure system comprises a photosensitive medium feeder 150 which feeding the photosensitive medium by the line under a control of the microprocessor 140.

Figure 7:
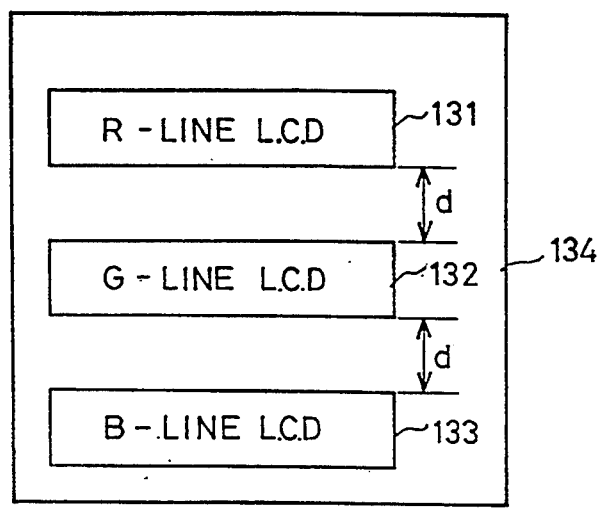
FIG. 7 illustrates a construction of a LCD panel in the system of FIG. 6.

Referring to FIG. 7, there is shown a construction of the LCD panel 130. As shown in this drawing, the R, G and B-line LCDs 131-133 in the LCD panel 130 are disposed on a LCD panel support 134, being spaced apart from one another at a desired distance d which is n times of a width of one horizontal line of the photosensitive medium, where n is a natural number.

Figure 8:
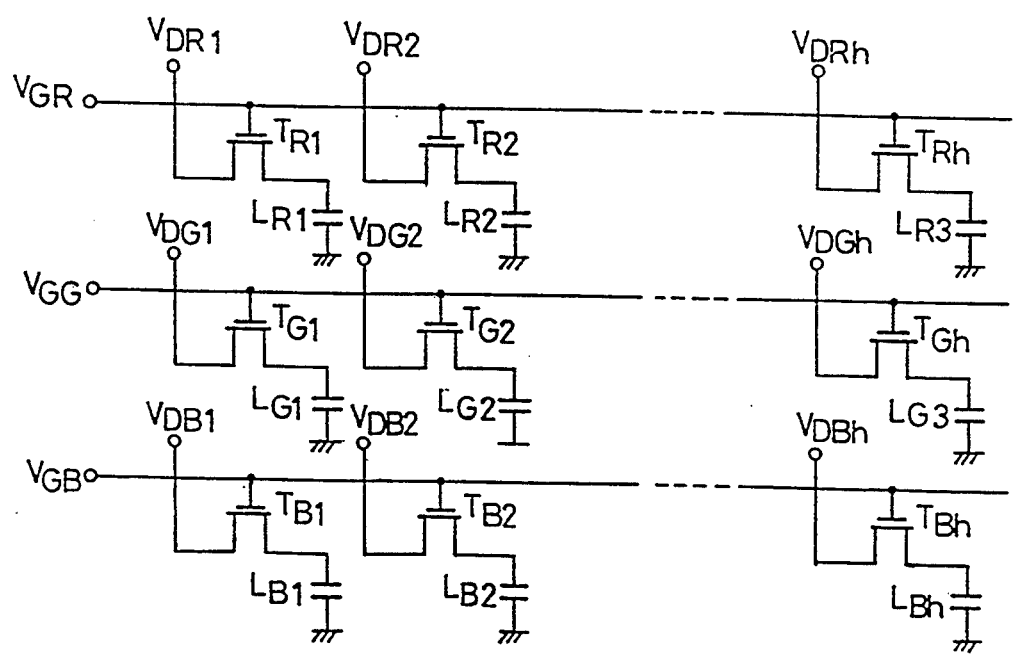
FIG. 8 is an equivalent circuit diagram of the LCD panel of FIG. 7.

Referring to FIG. 8, there is an equivalent circuit of the LCD panel 130. As shown in this drawing, the LCD panel 130 includes three, R, G and B groups of thin film transistors $T_{R1}$-$T_{Rh}$, $T_{G1}$-$T_{Sh}$ and $T_{B1}$-$T_{Bh}$ corresponding to the R, G and B-line LCDs 21-23 and to the number of pixels 1-h on one horizontal line, The three groups of thin film transistors $T_{R1}$-$T_{Rh}$, $T_{G1}$-$T_{Gh}$ and $T_{B1}$-$T_{Sh}$ are connected to three, R, G and B groups of liquid crystal elements $L_{R1}$-$L_{RH}$, $L_{G1}$-$L_{GH}$ and $L_{B1}$-$L_{Bh}$ which form corresponding pixels on the R, G and B lines, for driving them. The source terminals of the thin film transistors $T_{R1}$-$T_{Rh}$, $T_{G1}$-$T_{Gh}$ and $T_{B1}$-$T_{Bh}$ are connected to signal electrode terminals of the corresponding R, G and B liquid crystal elements $L_{RI}$-$L_{Rh}$, $L_{G1}$-$L_{Gh}$ and $L_{B1}$-$L_{Bh}$, a common electrode terminal of which is connected to ground. The gate terminals of the thin film transistors $T_{R1}$-$T_{Rh}$, $T_{G1}$-$T_{Gh}$ and $T_{B1}$-$T_{Bh}$ are commonly connected with one another by lines, in order to receive, by R, G and B lines, R, G and B gate voltages $V_{GR}$, $VC_{GG}$ and $V_{GB}$ from the LCD controllers 121-123. Also, the drain terminals of the thin film transistors $T_{R1}$-$T_{Rh}$, $T_{G1}$-$T_{Gh}$ and $T_{B1}$-$T_{Bh}$ are commonly connected with one another by pixels, in order to receive, by pixels, signal voltages $V_{DR1}$-$V_{DRh}$, $V_{DG1}$-$V_{DGh}$ and $V_{DB1}$-$V_{DBh}$ from the LCD controllers 121-123.

Now, the operation of the optical exposure system with the above-mentioned construction in accordance with the present invention will be described in detail.

As hereinbefore described, the R, G and B exposure amounts in the color video printer employing a fiber optics liquid crystal display package as the optical exposure system can be obtained as follows:

$$\text{Exposure amount} = T * n * \alpha * L \qquad \ldots (2)$$

where, T: period, n: the number of exposure times, α: transmitivity and L: amount of back light before transmission to the LCD panel. From this equation, it can theoretically be proposed to vary values of period T, the number n of exposure times, transmitivity a or light amount L, by pixels, in order to increase the gradation number of exposure amount. However, it is impossible to vary the period T by pixels, since the period T is a exposure period by pixels in consideration of the entire timing relation of the system. Also, it is impossible to vary the light amount L by pixels, since the light amount L is amount of back light before transmission to the LCD panel which should entirely be maintained at a constant value regardless of pixels. But, it is possible to vary the number n of exposure times and transmitivity α by pixels.

It is noted that varying the transmitivity α according to magnitudes of the signal voltages makes it possible color expressions of 8 gradations by R, G and B colors. Nevertheless, the transmitivities of the liquid crystal elements are limited to 8 gradations by reasons of a manufacturing technique. As a result, the increase in the gradation number of exposure amount by the variation of transmitivity is subjected to limitation.

For this reason, in accordance with the present invention, varying the number n' of exposure times is applied, with the transmitivity a being fixed.

$$\text{Namely, Exposure amount} = T * n' * \alpha 8 * L \qquad \ldots (2)$$

where, the period T is a fixed period, the transmitivity α8 is the maximum transmitivity fixed in consideration of a case where the number of exposure times may be at the minimum, the light amount L is amount of back light before transmission to the LCD panel and the number n' of exposure times is the number of times that the signal voltage V8 corresponding to the maximum transmitivity α8 is applied to respective pixels in the LCD panel.

Accordingly, the gradation (step) number of exposure amount by pixels is determined by the number n' of times that the signal voltage V8 is applied to respective pixels, which can be determined according to the corresponding pixels.

A method of determining the number n' of exposure times is carried out by multiplying a data value of a certain step by a specific constant K. For example, the number n' of exposure times of 64th step is obtained by multiplying a data value of 64th step by the specific constant K. Herein, the specific constant K is determined by an optical exposure experimentation such that the exposure amount is constantly maintained in spite of variation of the transmitivity.

Therefore, the optical exposure method according to the present invention is performed by fixing levels of the signal voltages for driving of the liquid crystal elements to fix the transmitivities of the elements, varying the number of exposure times by pixels to be proportioned to the magnitudes of the R, G and B signals and carrying out the optical exposure of the photosensitive medium in accordance with the varied number of exposure times by pixels, whereby the gradations of colors to be printed by the color video printer can be increased in number.

Referring again to FIG. 6, in operation, the microprocessor 140 stores the R, G and B video signals to be printed into the R, G and B frame memories 111-113 by the frame. For sending the R, G and B data from the frame memories 111-113 out to the R, G and B-line LCD controllers 121-123 respectively, the microprocessor 140 addresses the R, G and B frame memories 111-113 with respect to the horizontal lines and instructs the data transmission therefrom. As a result, the addressed R, G and B data from the frame memories 111-113 corresponding to the horizontal lines is sent out respectively to the R, G and B-line LCD controllers 121-123. Upon receiving the R, G and B data from the frame memories 111-113, the LCD controllers 121-123 temporarily store the R, G and B data respectively in their internal registers (not shown).

At this time, the microprocessor 140 applies shift clock signals to the R, G and B-line LCD controllers 121-123. In response to the shift clock signals from the microprocessor 140, the data by pixels stored in the internal registers of the LCD controllers 121-123 is shifted respectively to internal control logics (not shown) of the LCD controllers 121-123. The internal control logics of the LCD controllers 121-123 multiply the data by pixels by the specific constant K to determine the number n' of exposure times being proportioned to the data of the corresponding pixels. Then, the internal control logics of the LCD controllers 121-123 repeatedly output the liquid crystal element drive signal voltages $V_{DR}$, $V_{DG}$ and $V_{DB}$ respectively to the LCDs 131-133, based on the determined number n' of exposure times.

Noticeably, the number n' of exposure times is determined for all pixels on the horizontal lines. Also, the drain voltages corresponding to respective pixels are outputted according to the determined number n' of exposure times.

Referring to FIGS. 9A through 9G, there are shown timing diagrams illustrating the operation of the optical exposure system in accordance with the present invention.

If the gate voltages $V_{GR}$, $V_{GG}$ and $V_{GB}$ are applied respectively and commonly to the gates of the thin film transistors $T_{R1}$-$T_{Rh}$, $T_{G1}$-$T_{Gh}$ and $T_{B1}$-$T_{Bh}$ as shown in FIG. 9A and the first pixel voltage $V_{DR1}$ and the last pixel voltage $V_{DRh}$ of R color and the first pixel voltage $V_{DG1}$ of G color are applied respectively to the drains of the corresponding transistors as shown in FIGS. 9B, 9D and 9F, then the thin film transistors $R_{R1}$, $T_{Rh}$ and $T_{G1}$ are turned on by the R, G and B gate voltages $V_{GR}$, $V_{GG}$ and $V_{GB}$, so that the signal voltages $V_{DR1}$, $V_{DRh}$ and $V_{DG1}$ at the drains thereof are applied to the corresponding R, G and B liquid crystal elements $L_{R1}$, $L_{Rh}$ and $L_{G1}$. Then, the R, G and B liquid crystal elements $L_{R1}$, $L_{Rh}$ and $L_{G1}$ perform capacitor effects to maintain their levels respectively during one period T as shown in FIGS. 90, 9E and 9G. At this time, the signal voltages $VDR_1$, $VDR_h$ and $VDG_1$ are applied as the maximum level V8 to the R, G and B liquid crystal elements $L_{R1}$, $L_{Rh}$ and $L_{G1}$ so that the transmitivities of the elements are at the maximum ($\alpha 8$). Also, the reason why the signal voltages are applied as alternating current (AO) signals having polarities reversed every period is to avoid deteriorations in the liquid crystal elements.

As seen, the LCD controllers 121-123 respectively determine the number n' of exposure times by R, G and B video signals according to the signal data of one line, output the gate pulses based on the maximum value of the determined number n' of the exposure times and repeatedly output the signal voltages according to the determined number n' of exposure times, for driving the liquid crystal elements. The signal voltages are outputted as the maximum level V8 corresponding to the maximum transmitivity $\alpha 8$ of the liquid crystal elements.

Thereafter, upon completion of the optical exposure for one line, the LCD controllers 121-123 sends completion signals out to the microprocessor 140. Zn response to the completion signals from the LCD controllers 121-123, the microprocessor 140 controls the photosensitive medium feeder 150 to position the next horizontal line of the photosensitive medium on screens of the LCDs 131-133.

On the other hand, since the R, G and B-line LCDs 131-133 in the LCD panel 130 are disposed on the LCD panel support 134, being spaced apart from one another at a desired distance d corresponding to the horizontal line of the photosensitive medium, they receive signals by R, G and B colors of the corresponding lines respectively from the LCD controllers 121-123 at the same timing and perform the optical exposure for different corresponding horizontal lines of the photosensitive medium. Then, the repeated optical exposure of the different lines of the photosensitive medium to the R, G and B colors is carried out according to the feeling of the photosensitive medium, thereby resulting in completion of the optical exposure thereof.

According to the present invention, the R, G and B gradation number can be increased as much as an adjustable range of the number n' of exposure times. Although the gradation number may ideally be increased infinitely, it is preferred to increase the gradation number to 16 steps-64 steps by R, G and B colors since the exposure time is increased as the number n' of exposure times is increased.

As hereinbefore described, according to the present invention, the number of exposure times is varied, with the transmitivities of the liquid crystal elements being at the maximum by fixing the levels of the signal voltages. Therefore, gradations of colors to be printed by the color video printer can be increased in number so that sensitivity differences among R, G and B colors can be compensated for and visually-natural colors can be reemerged.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. An optical exposure method for a color video printer, comprising the steps of:
   providing R, G and B video data input values,
   fixing R, G and B levels of signal voltages for driving R, G and B liquid crystal elements in R, G and B liquid crystal displays, to fix transmissivities of said liquid crystal elements;
   determining a number of exposure times for the R, G and B levels proportioned respectively to said R, G and B video data input values;
   applying the signal voltages of the fixed R, G, and B levels to said R, G and B liquid crystal elements according to said number of exposure times so that said R, G and B liquid crystal elements are driven to produce an optical image; and
   carrying out optical exposure of a photosensitive medium with said optical image.

2. An optical exposure method for a color video printer, as set fourth in claim 1, wherein said step of determining the number of exposure times includes the step of:
   multiplying said R, G and B data values by a specific constant.

3. An optical exposure method for a color video printer, as set fourth in claim 1, wherein the signal voltages for driving said R, G and B liquid crystal elements are fixed at levels corresponding to maximum values for said transmissivities of said liquid crystal elements.

4. An optical exposure method for a color video printer, as set forth in claim 1, wherein the signal voltages for driving said R, G and B liquid crystal elements are alternating current signals having polarities reversed every period, to avoid deteriorations in said liquid elements.

* * * * *